United States Patent

[11] 3,610,497

[72] Inventor Itsuki Ban
829, Higashi-Oizumimachi, Nerima-ku, Tokyo-to, Japan

[21] Appl. No. 879,356
[22] Filed Nov. 24, 1969
[45] Patented Oct. 5, 1971
[32] Priority Nov. 27, 1968
[33] Japan
[31] 43/86345

[54] TAPE CARTRIDGE LATCHING APPARATUS
5 Claims, 7 Drawing Figs.

[52] U.S. Cl. ........................................ 226/89, 226/181, 242/197, 274/4, 274/11
[51] Int. Cl. ........................................ B65h 17/20
[50] Field of Search ........................................ 226/181, 89; 179/100.2 Z; 242/197–200, 55.19 A; 274/11 B, 11 C, 4 B, 4 C

[56] References Cited

UNITED STATES PATENTS

| | | | |
|---|---|---|---|
| 3,319,858 | 5/1967 | Schober ........................ | 226/90 |
| 3,494,528 | 2/1970 | Suzuki ........................ | 226/90 |

*Primary Examiner*—Richard A. Schacher
*Attorney*—Jacobs & Jacobs

ABSTRACT: A tape cartridge latching apparatus for a tape player utilizing an endless magnetic tape cartridge comprising a first lever engageable with and movable by a front edge of a cartridge when the cartridge is inserted into the player, a second lever mechanically cooperating with said first lever and movable to be positioned to engage the rear edge of said cartridge, a slide lever urged by a strong tension spring in one direction and carrying the first and second levers, and a stopper lever for restraining movement of the slide lever by the heavy tension spring when the cartridge is not inserted, the second lever urging the rear edge of the cartridge by the bias of the strong tension spring and advancing the cartridge to the playing position and maintaining the same in that position.

PATENTED OCT 5 1971 3,610,497

TAPE CARTRIDGE LATCHING APPARATUS

BACKGROUND OF THE INVENTION

The present invention relates to an endless magnetic tape cartridge player, and more particularly to a novel tape cartridge latching apparatus for positioning an endless magnetic tape cartridge insertable in the player.

Many of the currently available tape players have bean widely utilized due to the convenience that the magnetic tape in the cartridge may be reproduced by a simple operation, for instance, by merely inserting the cartridge into the player. The tape cartridge should be positioned in the playing position on the deck in the player wherein a pinch roller in the cartridge abuts against a capstan in magnetic tape drive means of the player and a magnetic tape in the cartridge comes in contact with a magnetic head in a magnetic-tape-playing circuit. To this end, various means have been proposed so that the tape cartridge is disposed in the playing position in the player. Most of the proposed means have been so adapted that the cartridge provides a hook or latching portion therein to effect positioning of the cartridge by engagement of the hook portion with a hook or locking member formed on the deck of the player. One of the typical means as mentioned above is constructed so that a notch in the form of the hook portion is provided in the sidewall of the cartridge and a retention roller as the locking member which is pressed into the notch is formed at the free end of a leaf spring of which one end is secured to the player deck. A disadvantage of this construction is that the player is limited to a particular type of cartridge in which a certain hook portion is provided in a certain position.

In view thereof, it has been desired to provide such means for positioning the cartridge in the playing position without depending upon the hook portion or latching portion provided on the tape cartridge side.

It is an object of the invention, accordingly, to provide a new and improved tape cartridge latching apparatus for a tape player utilizing an endless magnetic tape cartridge.

A further object of the invention is to provide a tape cartridge latching apparatus for a tape player utilizing an endless magnetic tape cartridge comprising a first lever engageable with a front edge of a cartridge when inserted into the player and thereby movable, a second lever mechanically cooperating with the first lever and movable to be positioned to engage the rear edge of said cartridge, a slide lever urged by a strong tension spring in one direction and carrying the first and second levers, and a stopper lever for restraining movement of the slide lever by the heavy tension spring when the cartridge is not inserted, the second lever urging the rear edge of the cartridge by the bias of the heavy tension spring and advancing the cartridge in the playing position and maintaining the same in that direction.

Another object of the invention is to provide a tape cartridge latching apparatus for a tape player utilizing an endless magnetic tape cartridge wherein by manually taking the tape cartridge positioned in the playing position out of the player the slide lever is moved against the bias of the spring through the second lever engaged with the rear edge of the cartridge, the stopper lever is returned to the position where it can retain the slide lever so that the cartridge is completely retracted from the playing position while the second lever is automatically returned to the position being not engaged with the rear edge of the cartridge.

Still another object of the invention is to provide a tape cartridge latching apparatus for a tape player utilizing an endless magnetic tape cartridge wherein by depressing a push button of a push rod connectively associated to the slide lever the slide lever is moved against the bias of the spring to retract the tape cartridge from the playing position.

According to the present invention, such the tape cartridge latching apparatus is provided by which the playing position of the cartridge is assured whatever the cartridge may be, for instance, irrespective of the hook portion, or different hook portion.

Other objects and advantages will become apparent from the following description of the exemplary embodiment of the invention illustrated in the drawings, in which:

DESCRIPTION OF THE PREFERRED EMBODIMENTS

Figure 1:
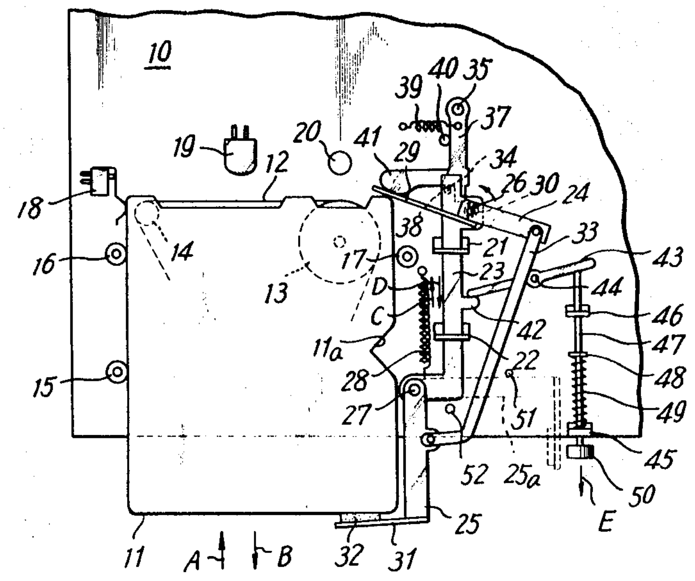
FIG. 1 is a schematic representation showing an embodiment of a tape cartridge latching apparatus according to the present invention.

In FIG. 1, numeral 10 is a horizontal deck which is provided within a housing for an endless magnetic tape player and on which is mounted an endless magnetic tape cartridge 11 inserted for play into a slot or tunnel opening (not shown) formed in the housing, and a tape cartridge latching apparatus, as will be detailed later, according to the present invention. The tape cartridge 11 includes a generally rectangular housing with a centrally disposed reel assembly (not shown) on which an endless magnetic tape 12 is wound and unwound in conventional manner. The endless tape 12 passes over a pinch roller 13 and guide 14. The pinch roller 13 and guide 14 are disposed at the leading edge of the cartridge whereat the cartridge sidewall is cut away or disposed with and the endless tape 12 is extended from the center of the hub of the reel (not shown) about the guide 14 and thence about the pinch roller 13 back to the outer periphery of a roll formed by the tape wound about the hub. Mounted on the deck 10 are guides 15 to 17 for the tape cartridge 11, a door switch 18 actuated by the tape cartridge 11, and a magnetic head 19. Further, a capstan 20 projects from the deck. The door switch 18 is incorporated in a control circuit for a motor (not shown) for rotatably driving the capstan 20. As will be set forth hereinafter, when the tape cartridge 11 is brought to the "-play" position, the door switch 18 is actuated by the cartridge and then closed thereby to energize the motor (not shown) rotatably driving the capstan 20. At the same time, the tape 12 held between the capstan 20 and the pinch roller 13 in the cartridge 11 is drivingly transported abutting against the magnetic head 19.

The tape cartridge latching apparatus according to the present invention as shown in FIG. 1 includes a slide lever 23 slidably supported by guides 21, 22 on the deck 10, a first lever 24 pivotally mounted by a pin 26 on the slide lever, and a second lever 25 pivotally mounted by a pin 27 on the slide lever. The slide lever 23 is adapted to slide parallel with the direction in which the cartridge 11 is inserted and is normally biased in the direction of arrow C by means of a comparatively strong tension spring 28. The first lever 24 is provided with a lever member 29 which is adjacent to the path of travel of the leading edge of cartridge 11. The lever member 29 is formed of leaf spring and fixed to the first lever 24. The first lever 24 and the lever member 29 may be integrally formed as a leaf spring. The first lever 24 is given a counterclockwise rotational force as indicated by the arrow so that it rotates about the pin 26 under the influence of a coil spring 30 as shown by dotted line. A pushing member 32 of rubber is attached to a bent portion 31 of the second lever 25 and is adapted to push the rear wall of the cartridge when inserted into the player.

The first lever 24 is connected at a pivot point near its free end to one end of a connecting crank arm 33. The other end of the connecting crank arm is pivoted to one portion of the second lever 25. Movement of the slide lever 23 in the direction of arrow C under the bias of the tension spring 28 is arrested when the cartridge 11 is out of the "play" position since a pin 34 projectively mounted on the slide lever at the under side thereof engages a hook portion 38 of a stopper lever 37 pivotally mounted by a sleeve 36 (FIG. 2) on a shaft 35 mounted on the deck 10. The stopper lever 37 is given the clockwise rotational force about the shaft 35 under the influence of the tension spring 39. This rotational force is arrested by a stopper pin 40 on the deck 10. The pin 34 on the slide lever 23 may engage the hook portion 38 when the stopper lever 37 abuts against the stopper pin 40. The stopper lever 37 is provided with a fingerlike portion 41 which is pushed by the lever member 29 toward the cartridge 11 insertable into the player. When the fingerlike portion 41 is pushed by the cartridge 11, the stopper lever 37 is counterclockwise rotated against the bias of the spring 39 to such a position where the hook portion 38 is released from the pin on the slide lever 23. For the purpose of illustration, the stopper lever 37 is exaggeratedly shown in FIG. 2.

A lever 43 of which one end engages a boss 42 of the slide lever 23 is swingably mounted on a pin 44 on the deck 10. A push rod 47 is slidably supported by guides 45, 46 fixed to the deck 10 so as to engage at the one end thereof the lever 43 at the other free end thereof. Provided between a ring member 48 secured to the push rod 47 and the guide 45 is an expansive spring 49 of which the elastic force urges the push rod to a position where the tip end is in contact with the lever 43. The rear end of the push rod 47 projects outwardly of the housing (not shown) of the tape player and is provided with a push button 50.

From the following description, the operation of the tape cartridge latching apparatus will be readily understood.

The slide lever 23 is caused to be in the position shown in FIG. 1 by engaging the pin 34 on the slide lever 23 with the hook portion 38 of the stopper lever 37 when the tape cartridge 11 is not inserted into the player. On the other hand, the first lever 23 assumes the position where it counterclockwise rotates over its position shown in FIG. 1 and the second lever 25 is in turn in a position indicated at 25*a* shown by dotted line to engage a stopper pin 51 on the deck 10. Engagement of the second lever 25 with the stopper pin 51 controls a counterclockwise rotational force of the first lever 24 by the spring 30. When the second lever 25 assumes the position 25*a*, insertion of the cartridge 11 into the player is not interrupted since the bent portion 31 is away from the slot (not shown) through which the cartridge passes.

Manual insertion of the cartridge 11 into the player in the direction of arrow A causes the front edge of the cartridge 11 to abut against the lever member 29. And further insertion of the cartridge in the same direction allows the lever member 29 and the first lever 24 to be rotated in the clockwise direction against the elastic force of the spring 30. With the clockwise rotation of the first lever 24, the second lever 25 is also clockwise rotated by means of the connecting link arm 33. FIG. 1 shows that the cartridge 11 is inserted to the extent that the lever member 29 abuts against the fingerlike portion 41 of the stopper lever 37. The second lever 25 is caused to be rotated until the pushing member 32 is opposed to the rear edge of the cartridge 11. Still further insertion of the cartridge causes the fingerlike portion 41 to be depressed over the lever member 29 to thereby rotate the stopper lever 37 in the counterclockwise direction against the bias of the spring 39. This allows the hook portion 38 to be released from the pin 34 on the slide lever 23 so that the slide lever 23 is slidably moved in the direction of arrow C due to the elastic force of the tension spring 28.

In movement of the slide lever 23 in the direction of arrow C, the rear edge of the cartridge 11 is pushed by the pushing member 32 on the second lever 23 whereby the cartridge 11 is inserted in the direction of arrow A to allow the pinch roller 13 to abut against the capstan 20, namely, to be in the "play" position. The relative position of the cartridge 11 to the magnetic head 19 and the capstan 20 is correctly controlled since the cartridge 11 inserted into the "play" position is such that not only the right sidewall thereof is urged by the lever member 29 and the left sidewall thereof abuts against the guides 15, 16 but also the rear edge is pressed by the pushing member 32. In association with actuation of the door switch 18 by the cartridge 11 in the "play" position, the capstan 20 is rotated to cause the magnetic tape 12 to be transported while abutting against the magnetic head 19. In slidable movement of the slide lever 23 by the bias of the spring 28 in the direction of arrow C, the lever 43 which engages the boss 42 is clockwise rotated to pressedly move the push rod 47 in the direction of arrow E against the elastic force of the expansive spring 49.

In order to retract the cartridge 11 from the "play" position, it is sufficient to manually push the pushbutton 50. As the pushbutton 50 is pressed, the slide lever 23 is moved by means of the push rod 47, the lever 43, and the boss 42 in the direction of arrow D against the bias of the spring 28. With slidable movement of the slide lever 23 in the direction of arrow D, the front edge of the cartridge 11 is pushed by the lever member 29 and moves in the direction of arrow B since the force of the pushing member 32 by which the rear edge of the cartridge is pushed has been lost. The pushbutton 50 is depressed until the slide lever 23 engages a stopper pin 52 on the deck 10 and hence depression of the pushbutton 50 is released. This allows the slide lever 23 to be slightly moved by the bias of the spring 28 in the direction of arrow C to engage the stopper lever 37 since the latter has been returned by the elastic force of the spring 39 to a position where it is retained by the stopper pin 40. The lever member 29 with the first lever 24 is counterclockwise rotated by the elastic force of the coil spring 34 to pressedly move the cartridge 11 at the front edge thereof in the direction of arrow B. Counterclockwise rotation of the first lever 24 rotates the second lever 25 counterclockwise via the connecting crank arm 33. When the second lever 25 is rotated to the position 25*a* and engages the stopper pin 51, rotation of the first lever 24 is blocked to prevent movement of the cartridge 11 by the lever member 29 in the direction of arrow B. At this moment, a portion of the cartridge 11 is still remained in the player, however, the second lever 25 is in the position 25*a* so that the cartridge 11 may be readily and manually take out from the player.

Instead of depression of the pushbutton 50 to retract the cartridge 11 from the "play" position, there may be an alternative way, soon to be described. That is, by manually pulling the rear portion of the cartridge 11 which projects outwardly of the housing (not shown) of the player in the direction of arrow B, the slide lever 23 is caused to be moved by the second lever 25 engaged by the rear edge of the cartridge 11 in the direction of arrow D against the bias of the spring 28 and the cartridge 11 is released from the slide lever 23 at a position where the slide lever abuts against the stopper pin 52. Whereupon, abutment force between the rear edge of the cartridge 11 and the pushing member 32 has been lost so that the second lever 25 and the first lever 24 are counterclockwise rotated by the elastic force of the coil spring 30 to have the second lever 25 take the position 25*a*. Thereafter, the cartridge 11 may be readily drawn out by hand of the player.

As described in the foregoing, according to the tape cartridge latching apparatus shown in FIG. 1, the cartridge 11 entirely depends upon the front and rear edges thereof but not a particular engaging portion such as the notch 11*a* provided on the sidewall so that different kinds of cartridges can be securely disposed in the "play" position regardless of the presence, absence or location of an engaging portion thereon.

Figure 3:
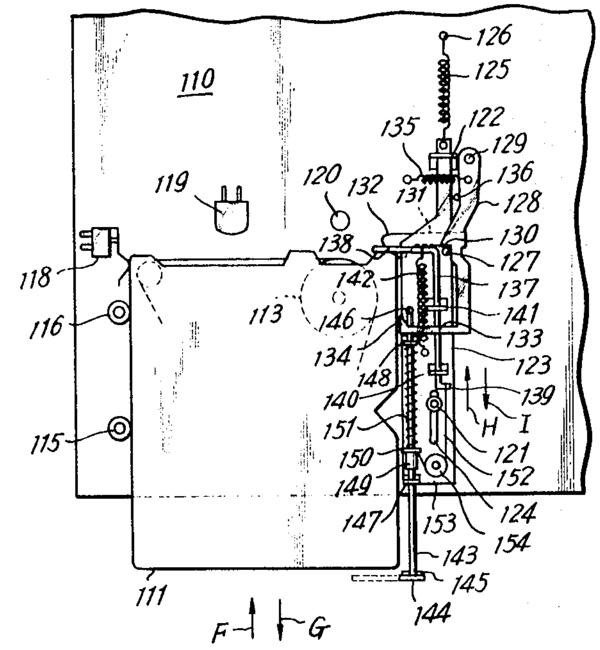
FIG. 3 is a schematic representation showing a modified embodiment of the tape cartridge latching apparatus.
Figure 4:
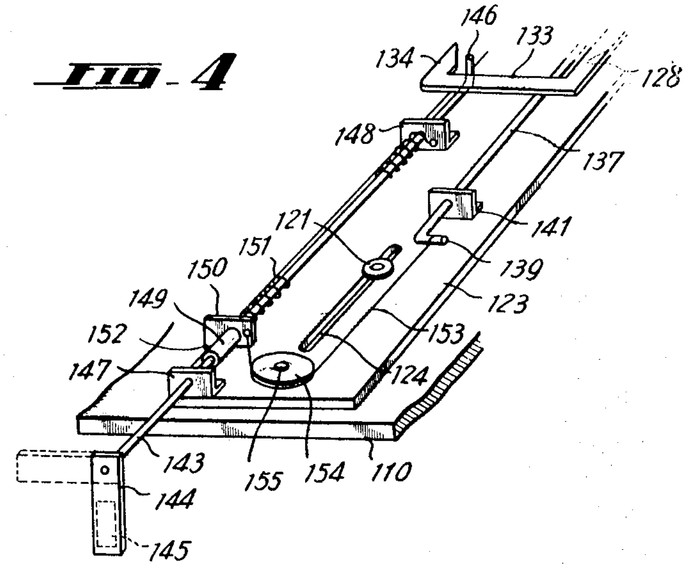
FIG. 4 is a perspective view showing relationship of the slide lever, first lever, and the second lever shown in FIG. 3.

A further embodiment of the tape cartridge latching apparatus of the present invention is shown in FIGS. 3 and 4. There are provided tape cartridge guides 115, 116, a door switch 118 actuated by a tape cartridge 111, a magnetic head 119, and an extending capstan 120 on a horizontal deck 110 mounted within a housing (not shown) for the magnetic tape player. The capstan 120 is adapted to be rotatably driven by a motor (not shown) which is energized in association with closing of the door switch. An endless magnetic tape 112 in the cartridge 111 is drivingly transported by the capstan in cooperation with a pinch roller 113 in the cartridge 111.

A slide lever 123 is mounted on the deck 110 and slidably supported in the direction of arrows H–I by a guide pin received in an elongated slot 124 in the slide lever and a guide 122 secured to the deck 110. A comparatively strong tension spring 125 extends between one end of the slide lever 123 and a spring holder 126 on the deck 110 to urge the slide lever 123 in the direction of arrow H. Movement of the slide lever 123 by the tension spring 125 in the direction of arrow H is prevented when a pin 127 on the slide lever engages a hook portion 130 of a stopper lever 128 pivotally provided on the deck 110 by an axis 129 whereby the cartridge 11 is not inserted into the player. The stopper lever 128 includes an arm 131 having a fingerlike portion 132 at one end thereof and an arm 133 having a bent portion 134 at one end thereof. The stopper lever 128 is given a clockwise rotational force by a spring 135 and its rotation is prevented by a stopper pin 136 on the deck 111 whereat the hook portion 130 engages the pin 127 on the slide lever 127. The fingerlike portion 132 of the arm 131 is caused to be pushed by the front edge of the cartridge 111 which is inserted into the player whereby the stopper lever 128 is counterclockwise rotated against the bias of the spring 135. This allows the hook portion 130 to be released from the pin 127 on the slide lever 123. A first lever or rod 137 having bent portions 138, 139 at opposite ends thereof is slidably provided by guides 140, 141 on the slide lever 123. The bent portion 138 of the lever 137 extends to engage the front edge of the cartridge 111 as inserted into the player. A tension spring 142 extends between the lever 137 and the slide lever 123. A second lever or rod 143 includes a pushing plate 144 to which a pushing member 145 of rubber or the like at its one end and a bent portion 146 at the other end. The second lever 143 is adapted to be rotated about its axis and supported by guides 147, 148 on the slide lever 123. The bent portion 146 of the second lever 143 as will be described hereinafter is engaged by the bent portion 134 of the stopper lever 128 when counterclockwise rotated whereby the first lever 143 is clockwise rotated about its axis to define an angle of about 90°. This causes the pushing plate 144 to be moved from the position shown by solid line to the position shown by dotted line as shown in FIGS. 3 and 4. From this it follows that the pushing plate 144 in the initial position positions away from a slot (not shown) in a housing (not shown) of the player to receive the cartridge. As the pushing plate is positioned in the second position, namely, it is over the slot. A substantially rectangular flange 150 is mounted with a sleeve 149 on the lever 143. A spring 151 is wound over the lever 143 and of which opposite ends are secured to the guide 148 and the flange 150, respectively. By the bias of the spring 151 and second lever 143 is given a direction reversed to the first lever 137 and a counterclockwise rotational force. Rotation of the second lever 123 by the spring 151 is arrested when a boss 152 of the flange 150 abuts against the edge of the slide lever 123 thereat the pushing plate 144 assumes the position shown by solid line. The first lever 137 and the second lever 143 are connected by a flexible string member 153 like nylon thread or the like which is guided by a guide pulley 154 rotatably provided by a pin 155 on the slide lever 123 and of which one end is engaged over the bent portion 179 and the other end is also engaged over the flange 150. Since the spring 142 is adapted to intensively work as compared with the spring 151, the first and second levers 137, 143 are urged by the elastic force of the spring 142.

It will be understood from the following description that in what manner the tape cartridge latching apparatus shown in FIGS. 3 and 4 is operated.

Manual insertion of the tape cartridge 111 into the player in the direction of arrow F presses the bent portion 138 of the first lever 137 toward the front edge of the cartridge causing the first lever 137 to be slidably moved against the bias of the spring 142. With movement of the first lever 137 the second lever 143 is allowed to be slidably moved by the string member 153 in the direction reversed to that of the lever 137. FIG. 3 shows that the cartridge 111 is inserted to the extent that the front edge thereof abuts against the fingerlike portion 132 of the stopper lever 128. When the cartridge 111 is further advanced from the position shown in FIG. 3 in the same direction, the fingerlike portion 132 is urged by the cartridge to counterclockwise rotate the stopper lever 128 against the elastic force of the spring 135. Rotation of the stopper pin 128 engages the bent portion 134 with the bent portion 146 of the second lever 143 to allow the second lever to be clockwise rotated to form an angle of about 90° as shown in FIG. 4. Thus, the pushing plate 144 is moved to the position shown by dotted line to oppose the pushing member 145 to the rear edge of the cartridge 111 while the hook portion 130 is disengaged from the pin 127 on the slide lever 123. Accordingly, the slide lever 123 is slidably moved at a stroke by the bias of the tension spring 125 in the direction of arrow H. This follows that the cartridge 111 is automatically advanced in the direction of arrow F as the rear edge of the cartridge is pushed by the pushing member 145. Advancement of the cartridge 111 is blocked by abutting the pinch roller 113 therein against the capstan 120 at the same time movement of the slide lever 123 in the direction of arrow H is arrested. Whereupon, the cartridge 111 is disposed in the "play" position where the pinch roller 113 abuts against the capstan 120 as the rear edge of the cartridge is depressed by the pushing member 145. Upon disposition of the cartridge in the "play" position, the door switch 118 is closed to energize the motor (not shown) to rotatably drive the capstan 120 allowing the endless magnetic tape 112 to be drivingly transported abutting against the magnetic head 119.

In order to draw the cartridge 111 from the player, the rear portion of the cartridge which projects from the housing (not shown) of the player is held by hand and pulled away in the direction of arrow G. Upon extraction of the cartridge 111, the slide lever 123 is movably returned by the second lever 143 in the direction of arrow I against the bias of the tension spring 125 as the pushing member 145 engages the read edge of the cartridge. At such position that the guide pin 121 comes in contact with the opposite end of the slot 124, the stopper lever 128 has been returned by the elastic force of the spring 135 so as to abut against the stopper pin 136 so that the hook portion 130 engaged the and 127 on the lever 123 by freeing the cartridge 111 from hand holding thereof whereby the slide lever 128 is engaged by the stopper lever 128. Upon release of the cartridge, force by which the pushing member 145 is engaged with the rear edge of the cartridge is lost to counterclockwise rotate the second lever 143 by the elastic force of the spring 151 to thus allow the second lever to be returned to the position shown by solid line. Then, the rear edge of the cartridge 111 is pressed by the bent portion 138 of the first lever 137 which is restored by the bias of the spring 142 thereby projecting the cartridge in the direction of arrow G. Even the first lever 137 is entirely returned, a portion of the cartridge 111 is still remained in the player. For this reason, the cartridge should be manually drawn out.

Figure 2:
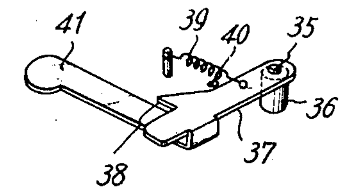
FIG. 2 is an enlarged perspective view of the stopper lever shown in FIG. 2.

From the foregoing description, it will be readily understood that the apparatus in FIGS. 3 and 4 may efficiently perform the object of the invention as similar to the apparatus shown in FIGS. 1 and 2.

Figure 5:
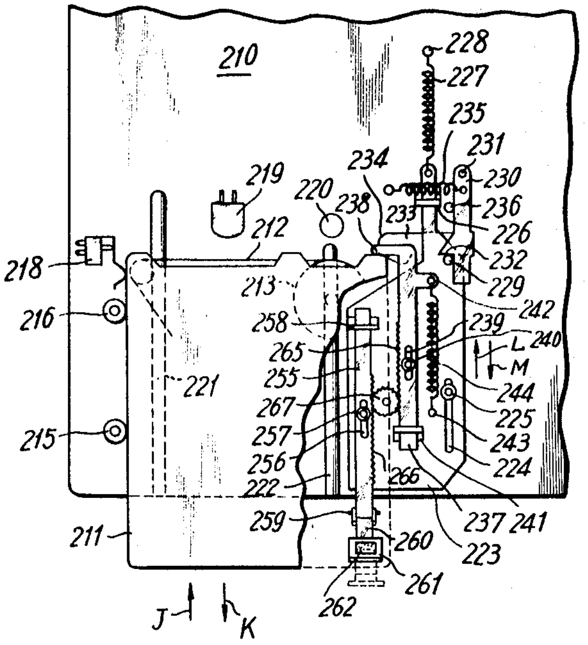
FIG. 5 is a schematic representation showing another embodiment of the tape cartridge latching apparatus according to the present invention.
Figure 6:
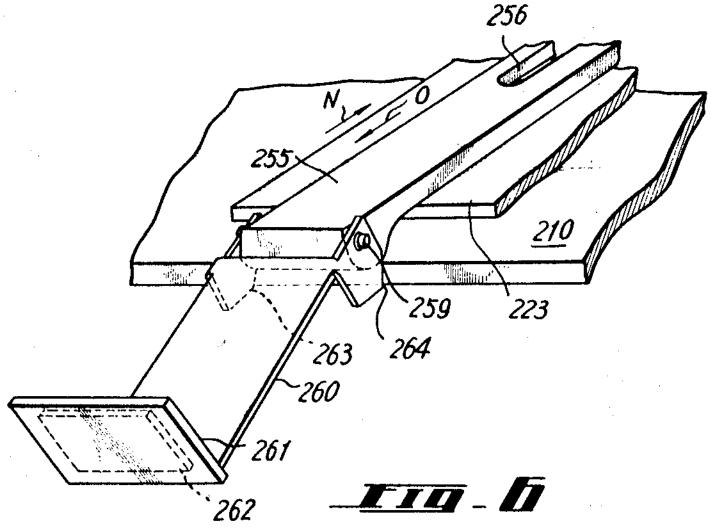
FIG. 6 is a perspective view of the relationship of the first lever and pushing lever shown in FIG. 1.

A further embodiment of the tape cartridge latching apparatus of the invention is illustrated in FIGS. 5 and 6.

Mounted on a horizontal deck 210 provided within a housing (not shown) of the magnetic tape player are tape cartridge guides 215, 216, a door switch 218 actuated by a tape cartridge 211, magnetic head 219, and two parallel tape cartridge guide rails 221, 222. A capstan 220 is provided to extend from the deck 210. The capstan 220 is caused to be rotatably driven by a motor (not shown) which is energized in relation to the closing of the door switch 218 and it cooperates with a pinch roller 213 in the cartridge 211 to drivingly feed an endless magnetic tape 212 in the cartridge 211. Between the cartridge 211 inserted into the player and the deck 210 there is provided a space defined by the guide rails 211, 222.

Figure 7:
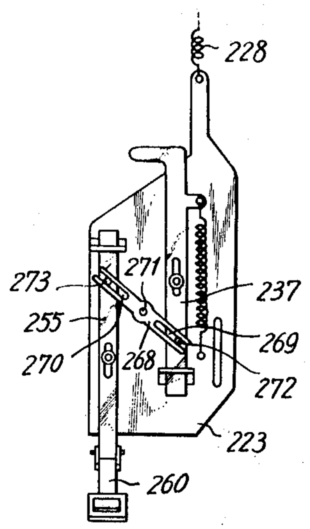
FIG. 7 is a representation showing another connecting mechanism different from that between the first and second levers shown in FIG. 5.

A slide lever 223 mounted on the deck 210 is adapted to be slidably moved in the directions of arrows L, M over the deck 210 by a pin 225 received in an elongated slot 224 in the slide lever and a guide 226 fixed to the deck 210. A comparatively strong tension spring 227 extends between the one end of the slide lever 223 and a spring holder 228 on the deck 210 to urge the slide lever 223 in the direction of arrow L. Movement force by the tension spring 227 of the slide lever 223 in the direction of arrow L is arrested when a pin 229 on the slide lever 223 engages a hook portion 232 of a stopper lever 230 slidably provided by an axis 231 over the deck 210 in the cartridge 211 is out of the player. The stopper lever 230 is provided at one end thereof with an arm 233 having a finger like portion 234. The stopper lever 230 is given a clockwise rotational force by a spring 235. Rotation of the stopper lever 230 is blocked by a stopper pin 236 mounted on the neck 210 whereat the hook portion 232 engages the pin 229 on the slide lever 223. The finger like portion 134 of the arm 233 is positioned to be pushed by the front edge of the cartridge 211 inserted into the player and the stopper lever 230 is counterclockwise rotated against the bias of the spring 235 when the finger like portion 234 is pushed by the cartridge 211. Rotation of the stopper lever 230 disengages the hook portion 232 from the pin 229 on the slide lever 223. A first lever 237 which is provided at one end thereof with a bent cartridge portion 238 is mounted on the slide lever 223 and it is adapted to be slided thereover by a guide pin 240 received in an elongated slot 239 in the lever 237, and a guide 241 fixed to the slide lever 223. The bent portion 238 of the first lever 237 extends to engage the front edge of the cartridge 211 inserted into the player. A tension spring 244 extends between a boss 242 of the first lever 237 and a pin on the slide lever 223 to urge the lever 237 in the direction of arrow M. A second lever 255 is mounted on the slide lever 223 and hingedly connected to swing lever 260 by a shaft 259 at one end thereof. The second lever 255 is also adapted to be slidable over the slide lever by a guide pin 257 received in an elongated slot 256 in the lever 255 and a guide 258 on the slide lever 223. The second lever 255 is disposed beneath the cartridge when inserted into the player but does not interfere with the base plate of the cartridge since the cartridge is along with the guide rails 221, 222. A pushing member 262 of rubber or the like is attached to a tab of the swing lever 260. The swing lever 260 is adapted to project from the deck 210 when the cartridge is not inserted into the player and it is lowered down about the shaft 259 due to its dead eight. The swing lever 260 includes its shoulders 263, 264 at opposite sides adjacent the end of the second lever and is lifted by the shoulders which engage the front edge of the deck 210 when the second lever 255 is slided in the direction of arrow N (FIG. 6) in relation to insertion of the cartridge 211. The swing lever 260 in the lifted position is shown by dotted line in FIG. 5. The first lever 237 has rack teeth 265 at one side thereof so as to oppose rack teeth 266 formed in the second lever 255 at one side thereof. A pinion gear 267 is rotatably mounted on the slide lever 223 to mesh with the rack teeth 265, 266 of the first and second levers. With this arrangement, movement of either one of the levers in one direction causes the other to be moved in the other direction. FIG. 7 shows another mechanism by which the first lever and the second lever are associated with each other in place of the rack-and-pinion mechanism in FIG. 5. For the purpose of better understanding, similar numerals are used to illustrate like parts in FIG. 5. A connecting lever 268 is rotatably mounted by a pivot pin 271 in the slide lever 223 and includes slits 269, 270 at opposite ends thereof. The slits 269 and 270 receive pins 272, 273 mounted on the first and second levers, respectively Sliding movement of the first lever 237 in one direction causes the second lever 255 to be moved in the other direction by means of the connecting lever 268.

The mode of operation of the tape cartridge latching apparatus shown in FIGS. 5, and 6 should now be apparent from the following description.

Manual insertion of the cartridge 211 into the player in the direction of arrow J allows the bent portion 238 of the first lever 237 to urge against the cartridge at the front edge thereof thereby moving the first lever 237 against the bias of the spring 244. As the first lever 237 is moved, the second lever 255 is moved in the direction of arrow O (FIG. 6). FIG. 5 shows that the cartridge 211 is inserted to allow the front edge thereof to abut against the finger like portion 234 of the stopper lever 230. Further insertion of the cartridge 211 in the direction of arrow J is made to cause it to be slightly advanced from the position shown in FIG. 5. As a result the finger like portion 234 is depressed by the cartridge to counterclockwise rotate the stopper lever 230 against the bias of the spring 235. Rotation of the stopper lever 230 disengages the hook portion 232 from the pin 242 on the slide lever 223. Accordingly, the slide lever 223 is slidably moved by the bias of the tension spring 227 in the direction of arrow L. With slidable movement of the slide lever 223 in the direction of arrow L, the second lever 255 is similarly moved and the shoulders 263, 264 of the spring lever 260 abut against the front edge of the deck 210 to upwardly rotate the swing lever 260 bringing the same in the position shown by dotted line as seen from FIG. 5. At the same time, the pushing member 262 attached to the tab 261 is opposed to the rear edge of the cartridge 211 to provide a clearance therebetween. Thereafter, the slide lever 223 is moved in the direction of arrow L to abut the pushing lever 262 against the rear edge of the cartridge 211 to urge the latter. In consequence, the cartridge 211 is advanced to a position where the pinch roller 213 abuts against the capstan 220. Whereupon the cartridge 211 is positioned in the "play" position where the pinch roller 213 abuts against the capstan 220. Disposition of the cartridge 211 in the "play" position closes the door switch 218 energizing the motor (not shown) to rotatably drive the capstan 220 thereby drivingly transport the endless magnetic tape 212 with abutting against the magnetic head 219.

In order to take the cartridge out of the player, the rear portion of the cartridge 211 projecting from the housing (not shown) of the player is held by hand and pulled in the direction of arrow K. After taking the cartridge out of the player, the slide lever 223 is returnedly moved by the second lever 255 in the direction of arrow M against the elastic force of the tension spring 227 since the pushing lever 262 engages the cartridge at the rear edge thereof. When the cartridge 211 in taken out from the position shown in FIG. 5 to the slightest extent in the direction of arrow K, since the stopper 230 is returned by the elastic force of the spring 235 to engage the stopper pin 236, if the cartridge 211 is free from hand the hook portion 232 engages the pin 229 allowing the slide lever 223 to retain the stopper lever 230. Force by which the pushing member 262 engages the rear edge of the cartridge is lost as the cartridge is free from hand whereby the swing lever 260 is rotated by its dead weight and returned to the position shown by solid line. At this moment, the front edge of the cartridge 211 is away from the bent portion 238 of the first lever 237 but they are slightly engaged with each other close to a position where the first lever 237 is returned by the elastic force of the spring 244. Restoration of the first lever 237 moves the second lever 255 in the direction of arrow N while the length of the slot 239 is determined not to allow the shoulders 263, 264 of the swing lever 260 to come in contact with the front edge of the deck 210 even the first lever 237 is completely returned. Because of this, in case of insertion of the next cartridge into the player, the tab 261 of the swing lever 260 is being away from a slot (not shown) provided in the housing (not shown) of the player to receive the cartridge whereby advancement of the cartridge is never interfered with.

As mentioned in the above, it will be readily understood that the apparatus shown in FIGS. 5 and 6, as similar to those embodiments illustrated in the other FIGS., may accomplish the object of the invention.

The invention and its attendant advantages will be understood from the foregoing description. It is to be understood that changes and variations may be made without departing from the spirit and scope of the invention as defined in the appended claims.

What is claimed is:

1. A tape cartridge latching apparatus for a tape player utilizing an endless magnetic tape cartridge, said player carrying thereon a housing, a slot formed in said housing for receiving said cartridge, said cartridge being inserted into said housing through said slot and including a deck in which a rotary capstan for (drivingly transporting) driving an endless magnetic tape in said cartridge in cooperation with a pinch roller in said cartridge and a magnetic head abutting against said magnetic tape are supported, comprising:

a slide lever slidably mounted on said deck for movement in parallel with the direction in which said cartridge is inserted, said lever being urged by a strong tension spring in the same direction as that in which said cartridge is inserted; a stopper lever swingably mounted on said deck to engage said slide lever when said cartridge is not inserted and to prevent movement of said slide lever by said strong tension spring, said stopper lever being biased by a spring member to a position where the stopper lever engages said slide lever, said stopper lever having a finger like portion which is adapted to be pushed by said cartridge when inserted into said housing and to be swung against the elastic force of said spring member when said finger like portion is pushed by said cartridge to thus release engagement of said stopper lever with said slide lever;

a first lever movably mounted on said slide lever and having an abutment arranged to abut against the front edge of said cartridge when the cartridge is inserted into said housing, said first lever being adapted to be moved against the elastic force of a spring member in relation to the sequence in which said abutment is pushed by the front edge of said cartridge;

a second lever movably mounted on said slide lever and mechanically connected to said first lever by a connecting member, said second lever having a pushing portion engageable with the rear edge of said cartridge inserted into said housing, said second lever being in a position where said pushing portion is retracted from the front of said slot formed in said housing when said cartridge is not inserted, said first lever and said stopper lever being operated by said cartridge which is inserted by hand into said housing through said slot, said slide lever being adapted to be moved by the bias of said strong tension spring upon disengagement of said slide lever with said stopper lever and said second lever being adapted to be moved to a position where said pushing portion engages the rear edge of said cartridge, said pushing portion urging said rear edge of said cartridge to advance said cartridge to the playing position where said pinch roller abuts against said capstan, and said cartridge being maintained in said playing position by the force by which said rear edge of said cartridge is pushed by said pushing portion.

2. A tape cartridge latching apparatus for a tape player utilizing an endless magnetic tape cartridge as claimed in claim 1 wherein said first lever is swingably mounted by a pin on said slide lever, said second lever is also swingably mounted by a pin on said slide lever, said first and second levers being connected to opposite ends of an elongated connecting arm said first lever being adapted to be rotated against the bias of said spring member by said cartridge inserted into said housing at the same time said second lever is rotated to move said pushing portion allowing the latter to be positioned to oppose the rear edge of said cartridge.

3. A tape cartridge latching apparatus for a tape player utilizing an endless magnetic tape cartridge as claimed in claim 2 wherein said slide lever has a boss at a portion thereof, a swing lever is swingably provided on said deck having one end engageable with said boss, a push rod is slidably mounted on said deck and extends outwardly of said housing at one end thereof, a pushbutton is at one end of said push rod, said push rod being engageable with the other end of said swing lever, said push rod being adapted to be slidably moved to project outwardly of said housing when said slide lever is moved by the elastic force of said strong tension spring, said slide lever being adapted to be moved against the bias of said heavy tension spring upon manual depression of said push button of said projected push rod whereby the cartridge is retracted from said position.

4. A tape cartridge latching apparatus for a tape player utilizing an endless magnetic tape cartridge as claimed in claim 1 wherein said second lever is in as elongated rod form and includes at one end thereof said pushing portion perpendicular to the longitudinal axis of said second lever and at the other end thereof forming a bent portion engageable with a portion of said stopper lever, said second lever being biased by a spring to a position where said pushing portion is retracted from the front of said slot of said housing, said stopper being adapted to be by said cartridge inserted into said housing and thus caused to be swung at which time said second lever is rotated by said stopper lever against the bias of said spring through said bent portion whereby said pushing portion is moved and positioned to engage the rear edge of said cartridge.

5. A tape cartridge latching apparatus for a tape player utilizing an endless magnetic tape cartridge as claimed in claim 1 wherein guide rails are provided between said deck and said cartridge to form a space therebetween said second lever being provided to slide over said deck and positioned within said space, said pushing portion being formed by a swing member hingedly connected to said second lever, said swing member having shoulders thereon and being projected outwardly of the front edge of said deck when said cartridge is not inserted and slanted downwardly to take a position retracted from the front of said slot of said housing, whereby when said slide lever is moved by the bias of said strong tension spring upon insertion of said cartridge the shoulders of said swing member engage the front edge of said deck and are upwardly swung to engage the rear edge of said cartridge.